(12) United States Patent
Genova et al.

(10) Patent No.: US 10,696,423 B1
(45) Date of Patent: Jun. 30, 2020

(54) METHOD FOR TRANSFERRING A SPACECRAFT FROM GEOSYNCHRONOUS TRANSFER ORBIT TO LUNAR ORBIT

(71) Applicant: USA as Represented by the Administrator of the National Aeronautics and Space Administration, Washington, DC (US)

(72) Inventors: Anthony L. Genova, Palo Alto, CA (US); Scott Mitchell, Louisville, CO (US)

(73) Assignee: United States of America as Represented by the Administrator of NASA, Washington, DC (US)

(*) Notice: Subject to any disclaimer, the term of this patent is extended or adjusted under 35 U.S.C. 154(b) by 507 days.

(21) Appl. No.: 15/397,653

(22) Filed: Jan. 3, 2017

Related U.S. Application Data (60) Provisional application No. 62/273,815, filed on Dec. 31, 2015.

(51) Int. Cl.
*B64G 1/00* (2006.01)
*B64G 1/24* (2006.01)
*B64G 1/10* (2006.01)

(52) U.S. Cl.
CPC .............. *B64G 1/007* (2013.01); *B64G 1/10* (2013.01); *B64G 1/242* (2013.01)

(58) Field of Classification Search
CPC ................................ B64G 1/007; B64G 1/242
See application file for complete search history.

(56) References Cited

U.S. PATENT DOCUMENTS

| | | | |
|---|---|---|---|
| 8,457,810 B1* | 6/2013 | Batla | B64G 1/007 244/158.4 |
| 8,655,589 B2* | 2/2014 | Grover | B64G 1/242 244/158.4 |
| 9,114,893 B2* | 8/2015 | Grover | B64G 1/66 |

* cited by examiner

*Primary Examiner* — Philip J Bonzell
*Assistant Examiner* — Tye William Abell
(74) *Attorney, Agent, or Firm* — Rhys W. Cheung; Robert M. Padilla (57) ABSTRACT

Method for placing a spacecraft into a lunar orbit, either by standard (i.e., impulsive) or ballistic (i.e., non-impulsive) capture, from an Earth orbit that is significantly inclined relative to the lunar orbit plane, with no constraint on the local time of perigee for the starting orbit.

9 Claims, 6 Drawing Sheets

METHOD FOR TRANSFERRING A SPACECRAFT FROM GEOSYNCHRONOUS TRANSFER ORBIT TO LUNAR ORBIT

CROSS REFERENCE OF RELATED APPLICATION

This application claims the benefit of U.S. Provisional Patent Application No. 62/273,815, filed on Dec. 31, 2015. The subject matter of the U.S. Provisional Patent Application is incorporated herein by its entirety.

ORIGIN OF INVENTION

The invention described herein was made in the performance of work under a NASA contract and by an employee of the United States Government and is subject to the provisions 51 U.S.C. § 20135(b), Public Law 111-314, § 3 (124 Stat. 3330, 51 U.S.C. Chapter 201), and may be manufactured and used by or for the Government or for governmental purposes without the payment of any royalties thereon or therefore.

FIELD OF THE INVENTION

This invention relates to the movement of a spacecraft from a first spatial orbit to a second spatial orbit via a sequence of maneuvers and lunar gravitational assistance. The first spatial orbit is that which is inclined at a significant angle to the lunar orbit plane. An example is geosynchronous transfer orbit (GTO) for which a significant inclination change is required to reach the second spatial orbit, a lunar orbit, either by standard (i.e., impulsive) or ballistic (i.e., no thrust needed) lunar capture.

BACKGROUND OF THE INVENTION

This invention arose from a need to move a spacecraft, traveling in a first orbit around a first body, into a second orbit around a second body, where a desired inclination plane for the second body may upon arbitrarily oriented. This problem arises in a proposed Dark Ages Radio Explorer (DARE) mission to study red-shifted radiation (21 cm wavelength; 40-120 MHz) from primeval neutral hydrogen atom transitions that may have occurred at a time adjacent to beginning of the universe after the Big Bang occurred. 80-420 million years after the Big Bang.

The Big Bang itself produced a universe that was initially hot, dense and relatively homogeneous. The universe cooled as it expanded; and a primordial plasma, estimated to have formed about 400,000 years after the Big Bang, produced energetic protons and electrons that later combined to provide neutral; hydrogen atoms and an optically thin "atmosphere." Photons from this age experienced reduced interactions with matter. These photons have produced a cosmic microwave background (CMB) that is still present, but tenuous. Stars and galaxies later formed and flooded the universe with ultraviolet photons sufficiently energetic to (re)ionize most or all of the hydrogen molecules (15.43 eV for single ionization). A primary goal of the DARE mission is to measure the spectral shape (intensities and wavelengths) associated with creation of the first stars and black holes, through measurement of a 21-cm red-shifter signal over a specified radio bandpass of 40-120 MHz. The red shift of primary interest is 11-35 cm, which is believed to correlate with the period 80-420 million years after the Big Bang.

Measurement of the red-shifted emissions requires a relatively dark and stable environment and avoidance of direct illumination by FM radio sources on the Earth and on the Sun. Direct illumination of the Moon's surface by these FM sources is approximately $10^9$ times as bright as the estimated intensity of the primordial emission signals that are sought by DARE. Measurements made on a portion of the far side of the lunar surface, which is not directly illuminated by the Sun's radio sources, may allow observations of the emissions that are not disturbed by the greater brightness.

A DARE observational vehicle was planned to orbit the Moon for about 3 years and accumulate relevant astronomical data exclusively on the lunar far side, when direct illumination by both the Sun and Earth is absent. Orbits inclined near the lunar equatorial and lunar orbit planes generally yield more cumulative observation time inside the aforementioned Sun and Earth shadow cones compared to significantly inclined orbits (e.g., polar). Although the DARE spacecraft's trajectory was designed to yield an equatorial lunar orbit, any inclination may be achieved using DARE's nominal trajectory. However, this invention focuses on the DARE transfer trajectory, from GTO to the lunar orbit plane and finally to lunar orbit, along with alternate methods to achieve lunar orbit.

SUMMARY OF THE INVENTION

To demonstrate this invention, the aforementioned transfer trajectory designed for the DARE spacecraft is presented via the procedure that follows. (1) After separation from GTO orbit, the spacecraft executes one or more velocity maneuvers at perigee, having a total velocity change magnitude $\Delta V1$ (e.g., $\approx$730 m/sec) to increase the apogee distance to a value of $\approx$800,000 km. The apogee altitude is raised beyond the Earth-Moon mean distance (of $\approx$384,000 km) such that the Moon's orbit can be intersected via a plane-change maneuver far from Earth's gravity well. The velocity change $\Delta V1$ is spread over multiple apogee-raising maneuvers to minimize possible finite burn losses near perigee and to allow phasing with the Moon (i.e., the Moon is encountered when the spacecraft's trajectory intersects the Moon's orbit).

(2) A contra-velocity maneuver (anti-parallel to spacecraft velocity vector) and/or normal-velocity maneuver (perpendicular to spacecraft velocity vector) by the spacecraft is executed at apogee with $\Delta V2$ (e.g., $\approx$277 m/sec), to set up a lunar flyby that yields an orbit in/near the Moon's orbit plane; this decreases the lunar approach speed at a subsequent encounter.

(3) A lunar flyby is executed on the Moon's leading edge or trailing edge. Where a ballistic lunar capture is needed, the flyby occurs on the Moon's leading edge; a standard capture is accommodated by either a leading or trailing edge flyby. (4) After the lunar flyby occurs, a contra-velocity maneuver $\Delta V3$ (e.g., $\approx$45 m/sec) is executed at the subsequent perigee so that the spacecraft is in a lunar resonance orbit (LRO). This LRO is designed to yield either a standard or ballistic lunar capture opportunity.

(5) A contra-velocity and/or normal-velocity maneuver $\Delta V4$ (e.g., $\approx$46 m/sec) is executed approximately 24 hours after the LRO perigee, to select a desired inclination (relative to the Moon lunar orbit) and a desired perilune altitude for the lunar orbit insertion maneuver. (6) A contra-velocity maneuver with $\Delta V5$ (e.g., $\approx$265 m/sec) is executed at a desired low perilune altitude (e.g., $\approx$500 km) for a standard lunar capture. This will yield an elliptical lunar orbit approximately 2.5 months from the time of beginning in GTO. Since the local time of perigee is not constrained, choice of any launch time of day is compatible with this method.

Several alternative velocity maneuver sequences, each incorporating Steps (1), (2), and (3) in the preceding, can be implemented to provide various methods of attaining the desired lunar orbit. The GTO may be replaced herein by other types of Earth orbits significantly inclined to the lunar orbit plane; ΔV values for maneuvers will vary accordingly.

BRIEF DESCRIPTION OF THE DRAWINGS

FIGS. 1L, 1TR, and 1BR illustrate a trajectory with an initial GTO right ascension of ascending node (RAAN) of 270 degrees (which corresponds to a GTO perigee with local time of 07:00 hours), viewed in Earth-centered, Earth inertial frames, oriented normal to (1L) and edge-on (1TR) relative to the lunar orbit plane, and in a Moon-centered, Moon inertial frame with view in the lunar equatorial plane (1BR).

DESCRIPTION OF THE INVENTION

Figure 2L:
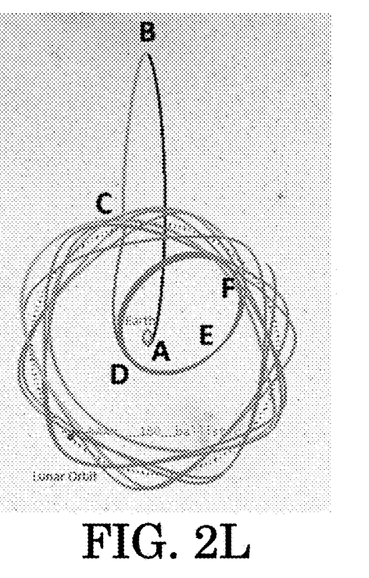
FIG. 2L illustrates a trajectory with initial GTO RAAN of 180 degrees (which corresponds to a GTO perigee with local time of 01:00 hours), viewed in an Earth-centered, Earth inertial frame, viewed normal to the lunar orbit plane.
Figure 2R:
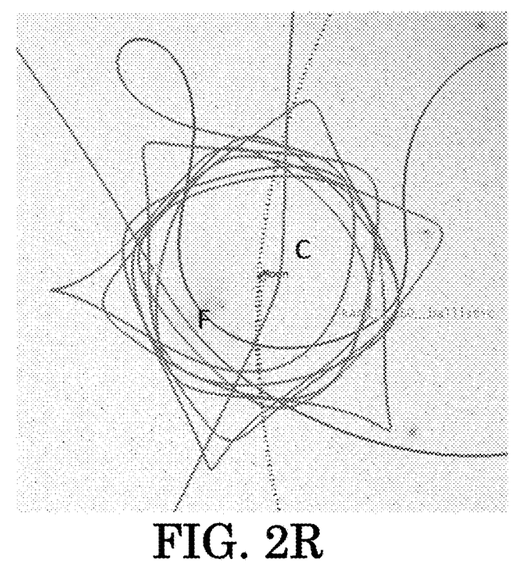
FIG. 2R illustrates the trajectory in a Moon-centered, Moon inertial frame, viewed normal to a lunar orbit plane.

To demonstrate the proposed method, a geosynchronous transfer orbit (GTO), inclined at a specified inclination (here, 28.5 degrees) to the Earth's equatorial plane is connected to a lunar orbit either by standard orbit insertion (i.e., impulsive, or thrust needed for initial capture into lunar orbit, FIGS. 2L and 2R).

Figure 3:
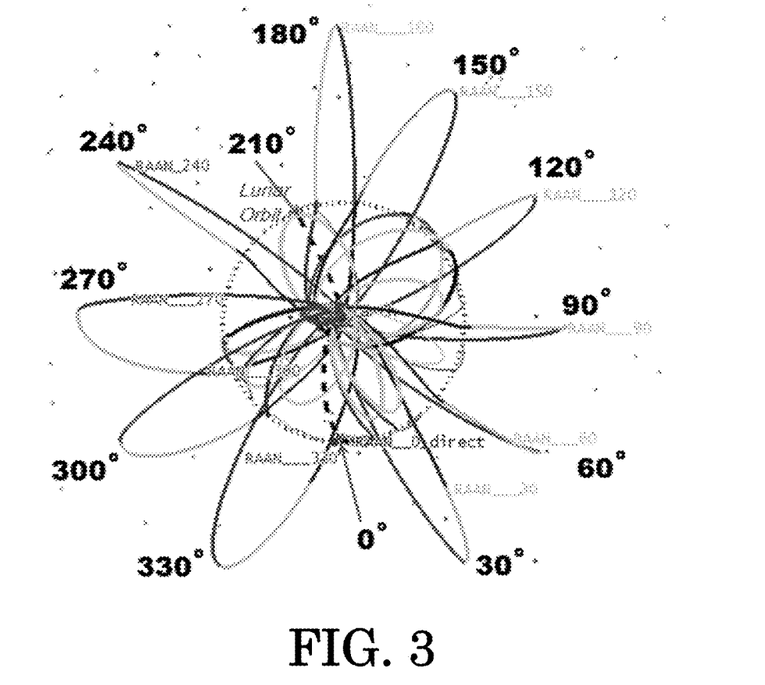
FIG. 3 illustrates multiple trajectory solutions (designed for the DARE spacecraft), with local time of the GTO perigee varied in 2-hour increments throughout a 24-hour period (analogous to varying RAAN from 0 to 360 degrees). The view is normal to the lunar orbit plane in an Earth-centered, Earth inertial frame.
Figure 4:
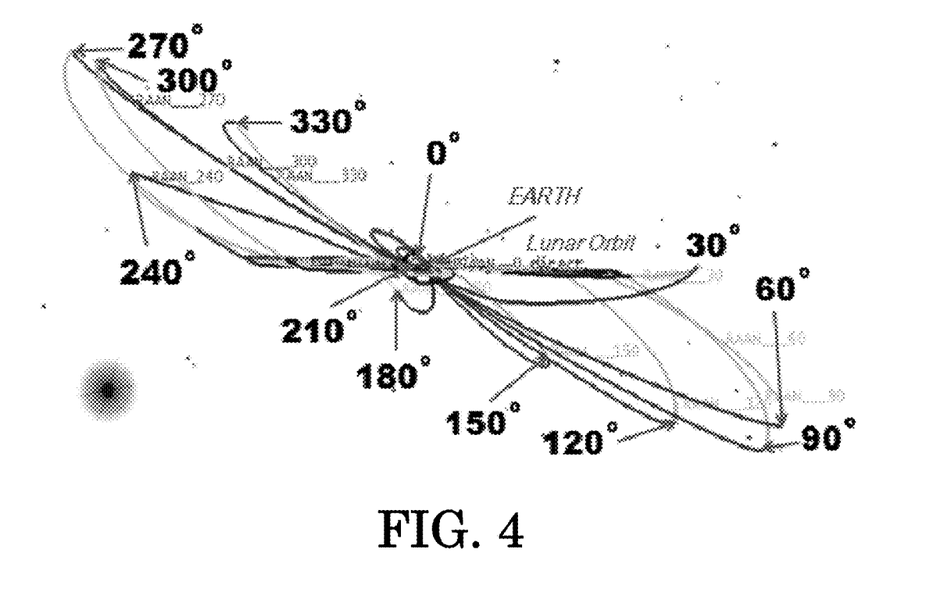
FIG. 4 illustrates multiple trajectory solutions (designed for the DARE spacecraft), with local time of the GTO perigee varied in 2-hour increments throughout a 24-hour period (analogous to varying RAAN from 0 to 360 degrees). The view is edge-on to the lunar orbit plane in an Earth-centered, Earth inertial frame.
Figure 5:
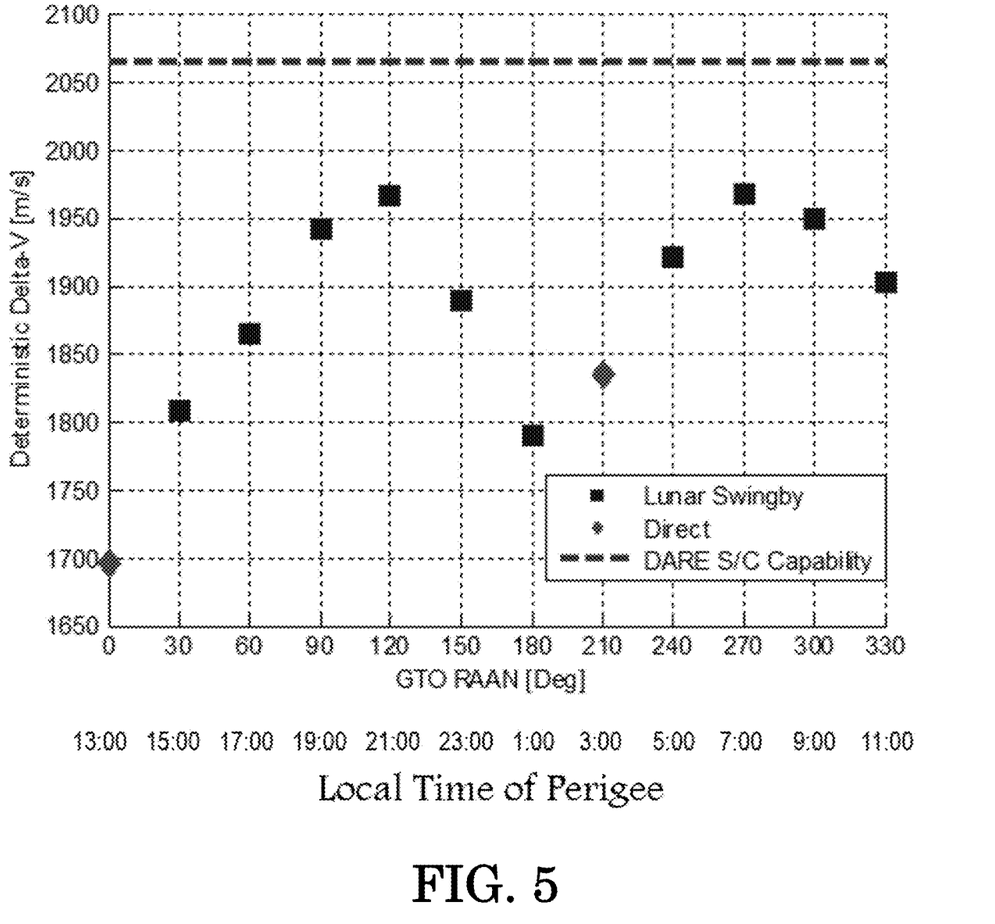
FIG. 5 displays a graph of the total deterministic ΔV required for DARE spacecraft trajectory solutions with varying local time of GTO perigee (i.e., the same trajectory solutions shown in FIGS. 3 and 4). The x-axis displays both local time of perigee and corresponding RAAN values.

Although this method is applicable to GTOs with any local time of perigee, two specific GTOs are chosen for presentation since they represent boundary cases among all similar lunar flyby solutions analyzed (local time of perigee is solved in 2-hour increments throughout a 24-hour period; see FIGS. 3, 4, and 5). The first GTO requires the largest magnitude total ΔV and is the most inclined to the lunar orbit plane; its corresponding local time of perigee is 07:00 hours, which corresponds to a RAAN of 270 degrees. The second GTO presented requires the least total ΔV and is the least inclined to the lunar orbit plane; the corresponding local time of perigee is 01:00 hours (corresponding to a RAAN of 180 degrees).

All velocity maneuvers are modeled as instantaneous delivery, unless noted otherwise. All trajectory segments were modeled in Systems Tool Kit (STK) Astrogator using an $8^{th}/9^{th}$ order Runge-Kutta integrator within a force model that included gravity fields for the Sun, Earth, Moon and all remaining planets.

Figure 8:
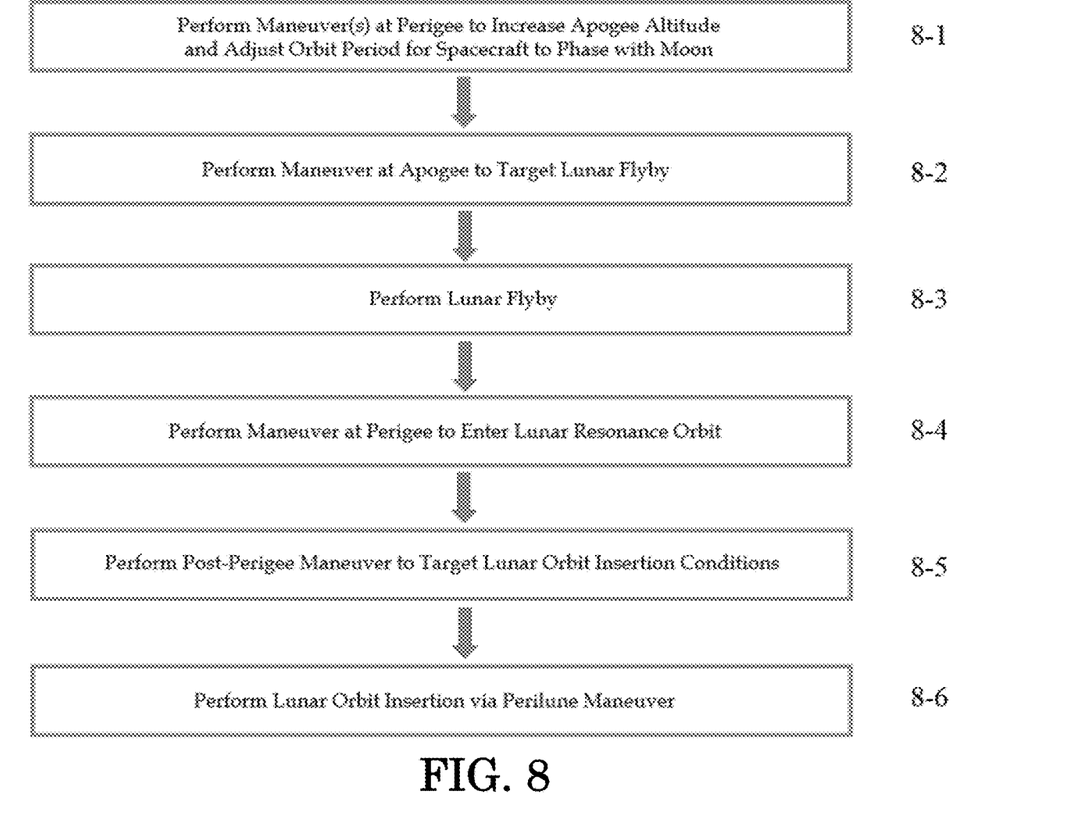
FIG. 8 is a Flow Chart generally illustrating six Steps to implement the invention.

Step 1: Spacecraft Maneuvers at Perigee to Increase Apogee Distance and Adjust Phase with Moon (8-1 on FIG. 8 Flow Chart)

After separation from the primary payload in GTO (FIG. 1L, site A or FIG. 2L, site A), the spacecraft will increase the apogee altitude to well beyond lunar distance (e.g., ≈800,000 kin from Earth) by executing a velocity maneuver at perigee (FIG. 1L, site A or FIG. 2L, site A) totaling ΔV1 (e.g., ≈730 m/sec). In the presented case, this velocity maneuver is divided into two or more separate maneuvers, which act as lunar phasing orbits with the benefit of also reducing gravity losses experienced by a spacecraft on this trajectory. These maneuvers are executed in the direction of the spacecraft's orbit velocity (with respect to its central body, the Earth in this phase).

Justification for choosing an apogee altitude beyond lunar distant, approximately 800,000 kin in the presented method, is as follows. Most geosynchronous transfer orbits do not intersect the lunar orbit plane. By extending apogee to beyond lunar distance, an out-of-plane maneuver (normal to the velocity vector direction) can be executed far from Earth's gravity well (and thus at relatively low ΔV cost) to yield an intersection with the Moon's orbit (and the Moon itself) on the return leg. Although this ΔV cost is more than that flown when apogee is farther from the Earth (e.g., 1.5 million km) the solution is simpler, more consistent, and yields a lower transfer duration. Proceed to Step 2.

Step 2: Maneuver at Apogee to Achieve Lunar Flyby (8-2 on FIG. 8 Flow Chart)

Figure 1:
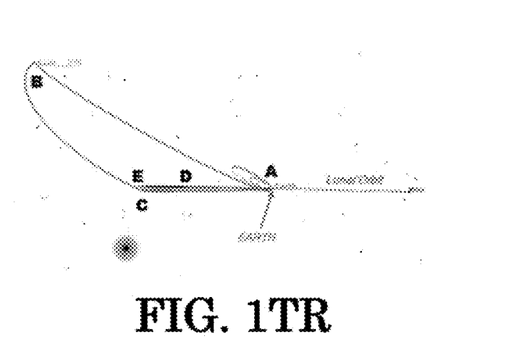
Figure 1L:
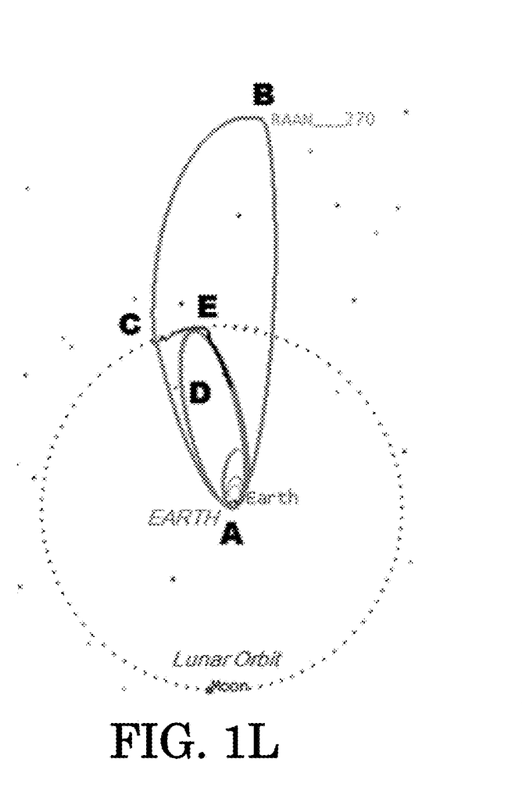

A velocity maneuver ΔV2 (e.g., ≈277 m/sec) is executed at apogee, FIG. 1L, site B or ΔV6 (e.g., ≈40 m/sec), FIG. 2L, site B), which allows the trajectory to intersect the Moon's orbit to set up a lunar flyby and enter the Moon's orbit plane; this decreases the lunar approach speed at a subsequent lunar encounter. This maneuver is executed in a direction normal to the velocity vector direction, with some of the component also in the contra-velocity or velocity direction. Proceed to Step 3.

Step 3: Perform Lunar Flyby (8-3 on FIG. 8 Flow Chart)

Execute the lunar flyby, either on the Moon's leading edge or trailing edge above its equator (targeted in Step 2L). No deterministic ΔV is needed to perform the lunar flyby. If a ballistic lunar capture is needed, the flyby occurs on the Moon's trailing edge; either a leading or trailing edge lunar flyby is compatible with a standard/direct lunar capture. Proceed to Step 4.

Step 4-1: Maneuver at Perigee to Enter Lunar Resonance Orbit LRO (8-4 on FIG. 8 Flow Chart)

A lunar resonance orbit is set up that yields a standard lunar capture opportunity (i.e., thrust is needed for initial capture into lunar orbit). After a leading (or trailing) edge lunar flyby (FIG. 1L, site C), execute a perigee contra-velocity maneuver with $\Delta V3 \approx 45$ m/sec near FIG. 1L, site A, to yield a lunar resonance orbit (FIG. 1L, site D). Proceed to Step 5.

Step 4-2: (Alternative to Step 4-1)

To set up a lunar resonance orbit that yields a ballistic lunar capture (i.e., no thrust is needed for initial capture into lunar orbit). After performing a trailing-edge lunar flyby (FIG. 2L or FIG. 2R, site C), execute a velocity maneuver at the subsequent perigee with $\Delta V7$ (e.g., $\approx 340$ m/sec) contra-velocity (FIG. 2L, site D) to yield a lunar resonance orbit (FIG. 2L, site E). The resulting orbit is now compatible with ballistic lunar capture about one month later, near perilune altitude (FIG. 2L or FIG. 2R, site F), given that the perigee altitude above $\approx 50,000$ kin and apogee altitude near lunar distance. The resulting capture will yield a lunar orbit with $C3 = -0.063$ km$^2$/sec$^2$. Lunar orbit is achieved.

Figure 6:
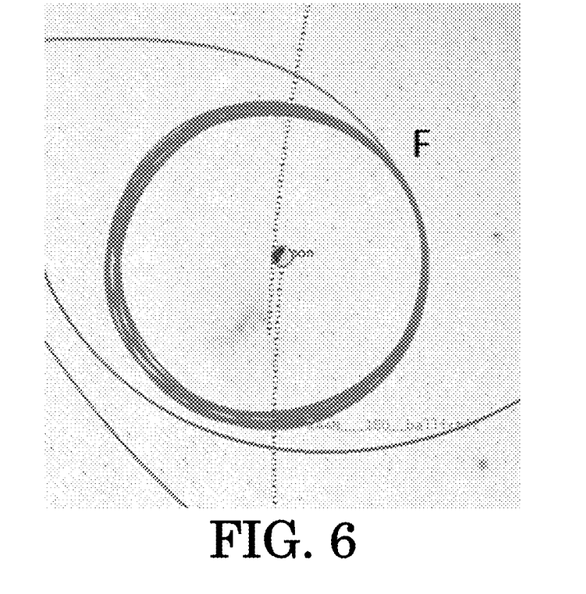
FIG. 6 illustrates a trajectory in a Moon-centered, Moon inertial frame, viewed normal to the lunar orbit plane, including a 100 m/sec ΔV preform at a time of ballistic capture, to strengthen the orbit by a reduction of C3 value.
Figure 7:
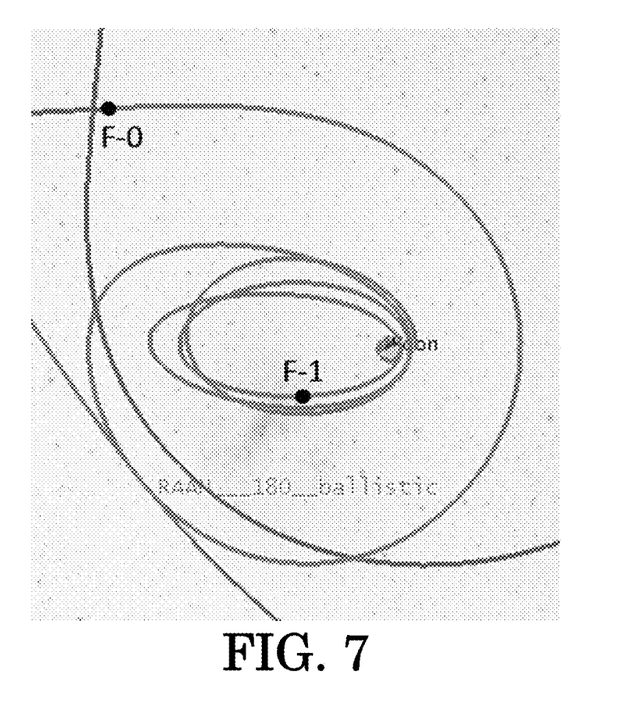
FIG. 7 illustrates a low-thrust maneuver (assuming 2 millinewton (mN) of thrust, with spacecraft wet mass of 10 kg), performed to strengthen a lunar orbit by change of C3; trajectory is shown in a Moon-centered, Moon inertial frame, viewed normal to the Moon's orbit plane.

Since a lunar ballistic capture does not provide long-term orbit stability, one or more contra-velocity maneuver(s) can be executed to strengthen (i.e. decrease the C3) of the lunar orbit. For example, a 100 m/sec contra-velocity maneuver is executed at perilune altitude (FIG. 6, site F) to reduce the C3 to approximately $-0.166$ km$^2$/sec$^r$. Alternatively, a contra-velocity, low-thrust (and finite) maneuver can be executed beginning before the ballistic capture (FIG. 7, site F-0) and continuing for $\approx 12.5$ days until a velocity increment $\Delta V5$ (e.g., $\approx 265$ m/sec; not instantaneous) is delivered (FIG. 4, site F-1); a C3 of $-0.258$ km$^2$/sec$^r$ is attained assuming the use of a 10 kg spacecraft (wet mass) with 2 millinewton thrust capability (FIG. 7). The corresponding lunar orbit period is $\approx 61$ hours. End of procedure.

Step 5: Post-Perigee Maneuver to Achieve Lunar Orbit Insertion Conditions (8-5 on FIG. 8 Flow Chart)

Execute a velocity maneuver $\Delta V4$ (e.g., $\approx 46$ m/sec) in the contra-velocity and/or normal-velocity direction of the orbit about 24 hours after the final perigee (near site A in FIG. 1L or FIG. 1TR) to select the specified inclination and perilune altitude conditions desired for the lunar orbit insertion maneuver. Proceed to Step 6.

Step 6: Lunar Orbit Insertion Maneuver at Perilune Altitude (8-6 on FIG. 8 Flow Chart)

Execute a contra-velocity maneuver of $\Delta V5$ (e.g., $\approx 265$ m/sec) at a low perilune altitude (500 km perilune altitude chosen for the presented case) near position site E of either FIG. 1L, FIG. 1TR, or FIG. 1BR. This will result in a 24-hour period elliptical lunar orbit ($C3 \approx -0.5$ km$^2$/sec$^2$), about 2.5 months after separation in GTO as seen in FIG. 1BR. Lunar orbit achieved, end of procedure. Each of Steps 1-6 is covered generally in a Flow Chart in FIG. 8.

From GTO as the starting orbit, the preceding ordered sequence of actions, taken or allowed to develop, will allow a spacecraft to be launched at any time from this orbit, to travel to and enter a lunar orbit having arbitrary inclination and arbitrary perilune altitude. The energy expended to transfer to this new orbit is represented by a sequence of $\Delta v$(m/sec) velocity perturbations and lunar gravitational assistance (e.g., lunar flyby) relative to the originally contemplated trajectory path, such that the desired final goal of lunar orbit is achieved. Application of the preceding sequence(s) to the DARE mission is one among many possible applications of the presented method.

What is claimed is:

1. A method for placing a spacecraft into a selected orbit, the select orbit comprising a lunar resonance orbit, in the lunar orbit plane, the method comprising:

placing a spacecraft into a selected geosynchronous transfer orbit (GTO), or orbit associated with a plane having a significant inclination relative to the Moon's orbit plane, with no constraint on the local time of perigee so that launch time of day is compatible;

for each of two or more spaced apart positions of perigee of a spacecraft trajectory, adding a selected velocity increment, $\Delta V1$, oriented in a present direction of spacecraft velocity vector, in order to increase an apogee height, h1, to a value greater than the Earth-Moon distance and to adjust a phase of the spacecraft to a selected phase value relative to a phase value of the Moon;

at an apogee position of the spacecraft, adding a selected velocity increment, $\Delta V2$ or $\Delta V6$, oriented in a first selected direction relative to present direction of spacecraft velocity vector, so that a subsequent spacecraft trajectory will execute a lunar flyby and will intersect the Moon's orbit, where the selected velocity increment, $\Delta V2$ or $\Delta V6$, has at least one of a contra-velocity component and a normal-velocity component;

executing the lunar flyby on at least one of the Moon's leading edge or the Moon's trailing edge so that the spacecraft enters the lunar orbit plane; and after the spacecraft has executed the lunar flyby, executing contra-velocity maneuver with a selected velocity increment, $\Delta V3$ or $\Delta V7$, at spacecraft perigee to yield a lunar resonance orbit in the lunar orbit plane.

2. The method of claim 1, further comprising selecting said apogee height, h1, for said spacecraft trajectory to lie beyond lunar distance.

3. The method of claim 1, further comprising selecting at least one of said velocity increments to have a value $\Delta V1=730$ m/sec, $\Delta V2=277$ m/sec, $\Delta V3=45$ m/sec, $\Delta V6=40$ m/sec, and $\Delta V7=340$ m/sec.

4. The method of claim 1, further comprising after the spacecraft has executed the lunar flyby, executing contra-velocity maneuver with a selected velocity increment, $\Delta V3$, at spacecraft perigee to yield a lunar resonance orbit that, in turn, yields a subsequent lunar encounter possibility;

after the spacecraft executes a final perigee in the lunar resonance orbit, executing a selected velocity maneuver, $\Delta V4$, to yield a selected inclination, relative to a lunar equatorial plane, and a selected perilune altitude above Moon surface; and executing a contra-velocity maneuver with a selected velocity increment, $\Delta V5$, at a selected low perilune altitude in order to produce a lunar orbit insertion and thus yield a lunar orbit.

5. The method of claim 4, further comprising selecting said apogee height, h1, for said spacecraft trajectory to lie beyond lunar distance.

6. The method of claim 4, further comprising selecting said perilune altitude to have a value of 500 km.

7. The method of claim 1, wherein the step of executing the lunar flyby is on the Moon's trailing edge;

after the spacecraft has executed the lunar flyby, executing contra-velocity maneuver with a selected velocity increment, $\Delta V7$, at spacecraft perigee to yield a lunar resonance orbit; and entering into lunar orbit by ballistic capture after entering the lunar resonance orbit without need for an insertion maneuver.

8. The method of claim 7, further comprising selecting said apogee height, h1, for said spacecraft trajectory to lie beyond lunar distance.

9. The method of claim 7, further comprising selecting the final perigee altitude, before lunar capture, to have a value of at least 50,000 km in order to yield subsequent ballistic lunar capture.

* * * * *